Feb. 6, 1945. D. S. KANE 2,368,713
FASTENING DEVICE
Filed May 22, 1942
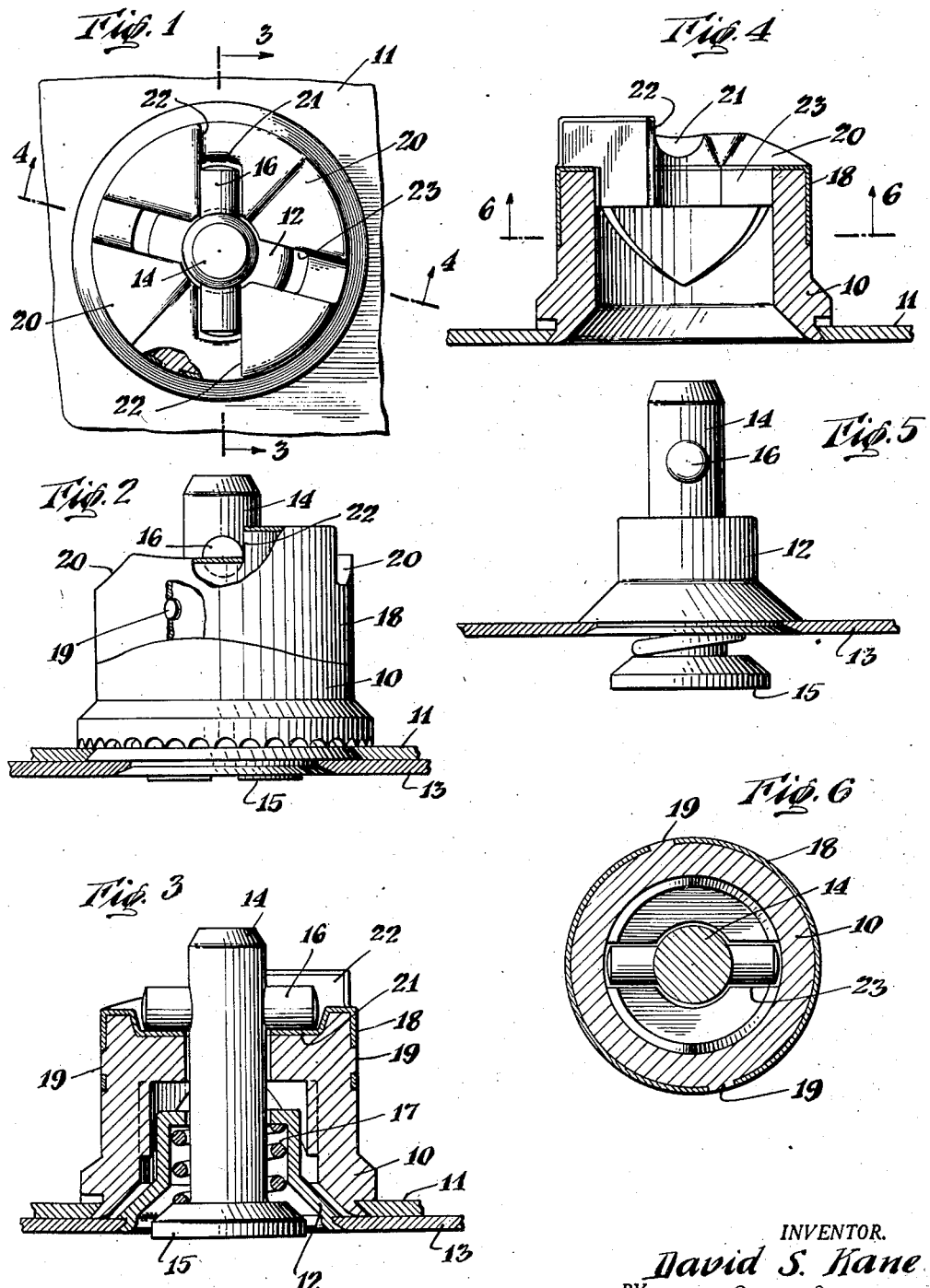
INVENTOR.
David S. Kane
BY
ATTORNEYS Patented Feb. 6, 1945

2,368,713

UNITED STATES PATENT OFFICE 2,368,713

FASTENING DEVICE

David S. Kane, Roslyn, N. Y., assignor, by mesne assignments, to Camloc Fastener Corporation, New York, N. Y., a corporation of New York Application May 22, 1942, Serial No. 444,116

4 Claims. (Cl. 24—221)

This invention relates to a new and improved fastening device of the quick operating type and particularly of the type which may be subjected to repeated opening and closing operations without appreciable wear on the parts.

It is another object to provide a fastener of this type which combines the desirable characteristics of resistance to wear on its load carrying surface, while at the same time, has a body that is light in weight and thus suitable for use, for example, in aircraft applications.

Still another object is that of providing a fastener embodying these characteristics which adapts itself to volume manufacture by automatic machines.

With these and other objects in mind, reference is had to the attached sheet of drawings, in which:

Fig. 1 is a plan view of a complete fastener embodying one form of my invention looking at said fastener from the bottom;

Fig. 2 is a side elevation of the form of fastener shown in Fig. 1;

Fig. 3 is a cross section in side elevation of the fastener shown in the preceding views taken along the line 3—3 in Fig. 1 looking in the direction of the arrows:

Fig. 4 is a further side elevation in cross section of the female portion of the fastener shown in the preceding views taken along the line 4—4 of Fig. 1 again looking in the direction of the arrows;

Fig. 5 is a side elevation of the male portion of the fastener shown in the preceding views and in position to cooperate with the female portion shown in Fig. 4; and Fig. 6 is a cross section taken through the fastener shown in the preceding views and especially in Fig. 4 along the line 6—6 in that figure looking in the direction of the arrows.

In the several views, the female portion of the fastener assembly or cam collar is represented at 10. This member may, for example, be flanged into an opening in a structural member 11 that forms a part of the structure to which the fastener is to be secured. Associated, for example, with the cover plate 13 of the structure is the male member of the fastener which may comprise a spring retaining cup 12 flanged in position into a registering opening in the plate 13, and a stud 14 having preferably a manipulating slotted head 15 at one end and a cross pin 16 adjacent its opposite end. In the embodiment illustrated, a spring 17 is interposed between the head 15 and the base of the spring retaining cup 12, and gives resilient positioning to the cross pin member as hereinafter brought out. In the fastener illustrated, the cross pin 16 of the stud assembly passes through an opening 23 at the base of the cam collar and then rides upwardly on opposed inclined planes 20 formed at the base of the cam collar, until a detent 21 at the top of said plane is reached at which point said cross pin falls into said detent and may be prevented from going beyond the same, for example, by a wall 22 formed in the contour of the cam collar base. The spring 17 keeps the cross pin seated under tension in the detent 21 against accidental displacement. The cam collar is preferably made from a forging or casting of a relatively light material so that weight can be conserved. This is especially true when the fastener is utilized for aircraft purposes. While such material has the advantage of a great saving in weight, it unfortunately does not resist abrasion or wear, and accordingly, great difficulty has been experienced in the past in providing a fastener embodying the weight saving characteristic desirable and at the same time one that will stand up under repeated opening and closing operations.

The repeated passage of the cross pin 16 along the cam surfaces 20 and into rest position in the detent 21 during the opening and closing of the fastener, causes wear where soft material is encountered. Such wear under extreme conditions can render the fastener unsuited for further use. Accordingly, and to overcome this difficulty, I propose utilizing a pathway of a relatively thin layer of abrasive resisting hard material such as stainless steel which is mounted on the outer surface of said cam collar in any suitable fashion, for example, as shown in the form of a shell or crown 18. This cap or shell may have the contour of the outer surface of the cam collar base including the inclined plane 20, the detent 21 and the wall 22, and as will be noted from the drawing, may if desired, extend downwardly along the outer surface of the cam collar for a portion of the distance so that it is securely held in place. In addition, the aluminum or other material from which the main cam collar body is formed may key into the shell as at 19.

It is of course apparent that the provision of a hard, durable wearing surface may be accomplished in many ways other than that described in the foregoing specification, and accordingly, the same should be construed purely as illustrative and not in a limiting sense.

I claim:

1. In a separable fastener of the type having a cam collar provided with a central opening receiving a stud and an exterior cam surface and detent receiving a stud cross pin, a new cam collar comprising an interior body of light, soft material having one surface provided with a cam pathway and pin engaging detent, an outer body comprising a thin, hard, wear-resisting material formed to provide a cam pathway and detent conforming to that of the interior body and in intimate surface contact therewith, whereby the outer hard, wear-resisting surface receives the wear of the movements of a stud cross pin thereon.

2. In a separable fastener of the type having a cam collar provided with a central opening receiving a stud and an exterior cam surface and detent receiving a stud cross pin, a new cam collar comprising an interior body of light, soft material having one surface provided with a cam pathway and pin-engaging detent, an outer body comprising a thin, hard, wear-resisting material formed to provide a cam pathway and detent conforming to that of the interior body and in intimate surface contact therewith throughout the cam surface and detent areas, whereby the outer hard, wear-resisting surface receives the wear of the movements of the stud pin thereon, and said surface is supported by said light-weight interior body.

3. A composite metal coupling member comprising a relatively lightweight metal backing portion and a thin crown portion of relatively hard wear-resisting metal, the crown portion being shaped with cam trackways and detents for cooperation with the locking pin of a cooperating coupling member, the backing portion contiguous to the crown portion being shaped complementally thereto, and said crown portion and said backing portion being anchored against relative displacement.

4. A socket coupling member of generally cylindrical configuration formed at one end with opposed cam trackways terminating adjacent their outer ends in detents, said socket member having a central opening therethrough and a diametrical slot disposed at an angle to the line joining the detents, characterized in that said socket member comprises a base portion of lightweight metal and has its end which is provided with the trackways and detents crowned with a relatively hard wear-resisting metal.

DAVID S. KANE.